(12) United States Patent
Stinger

(10) Patent No.: US 6,757,870 B1
(45) Date of Patent: Jun. 29, 2004

(54) AUTOMATIC TABLE DETECTION METHOD AND SYSTEM

(75) Inventor: James R. Stinger, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/532,538

(22) Filed: Mar. 22, 2000

(51) Int. Cl.[7] .................................................. G06F 15/00
(52) U.S. Cl. ........................ 715/513; 707/104; 707/508
(58) Field of Search ................................ 715/523, 513, 715/522; 707/104, 508

(56) References Cited

U.S. PATENT DOCUMENTS

| | | | |
|---|---|---|---|
| 5,841,900 A | | 11/1998 | Rahgozar et al. ............ 382/176 |
| 5,854,853 A | * | 12/1998 | Wang ........................... 382/176 |
| 5,956,422 A | * | 9/1999 | Alam ........................... 382/181 |
| 5,978,767 A | * | 11/1999 | Chriest et al. ................. 705/1 |
| 6,167,409 A | * | 12/2000 | DeRose et al. .............. 715/513 |
| 6,173,073 B1 | * | 1/2001 | Wang ........................... 382/176 |
| 6,233,571 B1 | * | 5/2001 | Egger et al. .................... 707/2 |
| 6,336,124 B1 | * | 1/2002 | Alam et al. .................. 715/523 |
| 6,542,901 B1 | * | 4/2003 | Devine et al. ............ 707/104.1 |
| 6,562,077 B2 | * | 5/2003 | Bobrow et al. ............. 715/517 |
| 6,633,915 B1 | * | 10/2003 | Hashimoto .................. 709/228 |

* cited by examiner

*Primary Examiner*—Joseph H. Feild
*Assistant Examiner*—Dang T Nguyen

(57) ABSTRACT

A method for automatically detecting table data in a document that is described by a page definition language and converting the table data into a markup language representation. The document may have one or more pages. The page definition language description of the document provides a list of words, the position of the each on a page with respect to a predetermined reference point, and the size of each word. The present invention automatically identifies table data in the document by utilizing one or more table-identifying features. A first table-identifying feature may be the number of word clusters on a line. A second table-identifying feature may be the vertical alignment of word clusters between lines. A third table-identifying feature may be the changes in text density or space density between lines.

11 Claims, 7 Drawing Sheets

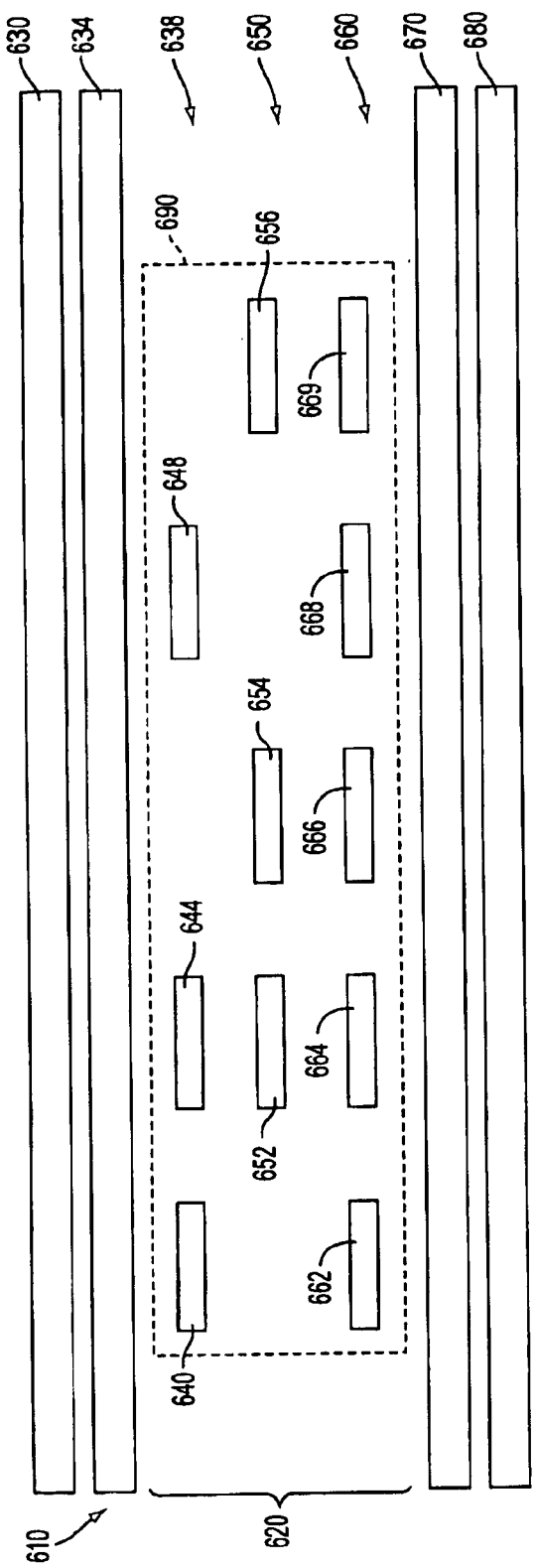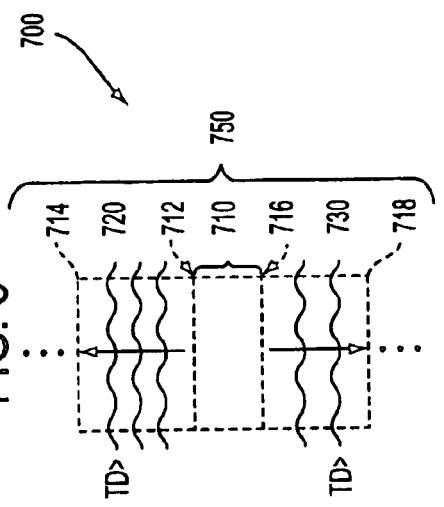

AUTOMATIC TABLE DETECTION METHOD AND SYSTEM

FIELD OF THE INVENTION

The present invention relates to a method for recognizing tables within a document, and more specifically, to a method for automatically detecting tabular data in semi-structured documents using text coordinates.

BACKGROUND OF THE INVENTION

In a time when documents can exist in many forms and formats, the need for automatic document conversion software that can convert between these different formats has increased dramatically. One type of information in documents that is difficult to detect and convert accurately are tables. As explained herein below, the prior art approaches to convert tables offer only tolerable solutions that have much to be desired.

This is unfortunate since tables are useful in conveying much information in a compact format. One reason for the effective nature of conveying information through tables is that part of the information is presented by the structure of the table and is in fact inherent in the table structure. For example, column headings, row headings, table title, and the grouping of the information all can convey important information.

Since tables by their very nature convey information by their structure, it is important that any document conversion software accurately reflect the original structure in the converted form. As will be described herein below, some conversion software cannot handle the table structure and presents the table data as regular text, thereby stripping the structure that existed in the original table. As can be appreciated, much information is lost in such an approach. Other software attempts to convert the table and retain the structure, but do so poorly. For example, if a conversion software handles tables poorly, information can be presented inaccurately. For example, if a converted table has values that actually belong in a first column (i.e., the values are in the first column in the original document) mistakenly transported to another column, then the converted table provides incorrect data. In the best case, the information is obviously wrong and can be easily detected as such, and ignored by one who reads the document. However, in a more detrimental case, if the error is not obvious, then the one reading such a document can rely on the erroneous information to his or her peril. From the above, it can be seen that the accurate detection and conversion of tables from a document in a first format to a document in a second format are important tasks that, unfortunately, pose challenging problems to existing conversion software. There are currently several unsatisfactory approaches to this problem.

U.S. Pat. No. 5,841,900, entitled "Method for Graph-Based Table Recognition," describes a bottom-up approach for recognizing tables in documents. In this approach, the document is first transformed into a layout graph with nodes and edges that represent document entities and their interrelations, respectively. Next, the layout graph is re-written using a set of rules based on apriori document knowledge and general formatting conventions. The graph is then utilized to locate tables in documents.

This bottom-up approach has several disadvantages. First, although the '900 patent provides a more efficient way of transforming documents into corresponding layout graphs, this approach is nevertheless more computationally intensive than an approach that does not need a layout graph. In addition, segmenting every document into a corresponding layout graph with its objects is a generally complex programming process and is not easily implemented. Second, the step of re-writing the graph requires access to a set of rules and formatting conventions that consume additional memory.

Some document conversion programs attempt to perform automatic document conversion from one format to another. For example, there are commercial products that attempt to convert text in Adobe Portable Document Format (PDF) to Hypertext Markup Language (HTML) Unfortunately, these products handle tables very poorly. In fact, these products "flatten the table" (i.e., these products represent tables as straight text with no structure whatsoever). For example, a table having four rows and four columns would be converted to four lines of straight text. As discussed previously, it is undesirable to remove the table structure since removing the structure causes important information conveyed by the table structure or inherent therein to be lost.

Other document conversion software programs require a user to manually identify where the tables are in a document so that the tables can be converted to a structured form. For example, document conversion software programs, such as Gemini from Iceni Technology Limited of Norwich, England or Redwing from Datawatch, Inc. of Lowell, Massachusetts both require manual intervention in order to perform table conversion. Manual intervention is undesirable for at least two reasons. First, manual intervention consumes a user's time and effort. Second, manual intervention prevents the ability to process document conversion off-line, such as by utilizing batch processing. Batch processing is particularly important in instances where there are numerous documents to convert from one form to another.

Based on the foregoing, it is clearly desirable to provide an apparatus and method for efficiently and automatically detecting and converting tables in documents. In particular, it is desirable to provide a method for efficiently and automatically detecting tables in documents that are semi-structured (i.e., described by a page description language) and for converting these tables into a markup language.

SUMMARY OF THE INVENTION

The present invention provides a method for automatically detecting table data in a document that is described by a page definition language and converting the table data into a markup language representation while preserving the structure of the table. The document may have one or more pages. The page definition language of the document, which can be the Portable Document Format, provides a list of words, the start position of each word on the page with respect to a predetermined reference point located on that page, and the size of each word.

According to the method, the present invention automatically identifies table data in the document by utilizing one or more table-identifying features. A first table-identifying feature may be the number of word clusters on a line. A second table-identifying feature may be the vertical alignment of word clusters between lines. A third table-identifying feature may be the changes in text density or space density between lines. In addition, the automatic identification technique of the present invention may also use one or more heading rows at the top of the table as a fourth table-identifying feature. Also, a fifth table-identifying feature can be the drawing lines that separate different data elements in the table.

In the presently preferred embodiment, the alignment of word clusters between lines is utilized to automatically generate a table bounding box for each table. Next, the table bounding box is then expanded in a first direction based on changes in word density among the lines immediately preceding the top edge of the table. For example, the table bounding box can be expanded in a first direction to encompass a previously marked line that had a significant change in text density.

The table bounding box is also expanded in a second direction based on changes in word density among the lines immediately succeeding the bottom edge of the table. For example, the table bounding box may be expanded in a second direction to encompass a previously marked line that had a significant change in text density.

This step expands the table bounding box in the positive and negative y-directions to more accurately reflect the true beginning and end of the table. The text that is encompassed by the expanded table bounding box is then converted to a markup language representation with table tags, thereby preserving the structure of the table.

BRIEF DESCRIPTION OF THE DRAWINGS

The present invention is illustrated by way of example, and not by way of limitation, in the figures of the accompanying drawings and in which like reference numerals refer to similar elements.

FIG. 6 illustrates an exemplary document and how the method of the present invention can be applied thereto to automatically detect table data in the document in accordance with one embodiment of the present invention.

FIG. 7 illustrates an exemplary document with a table and how the present invention expands the table bounding box in accordance with one embodiment of the present invention.

DETAILED DESCRIPTION OF THE PREFERRED EMBODIMENT

A method and apparatus for automatically detecting table data in an electronic document and converting the table data into a markup language while preserving the table structure are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
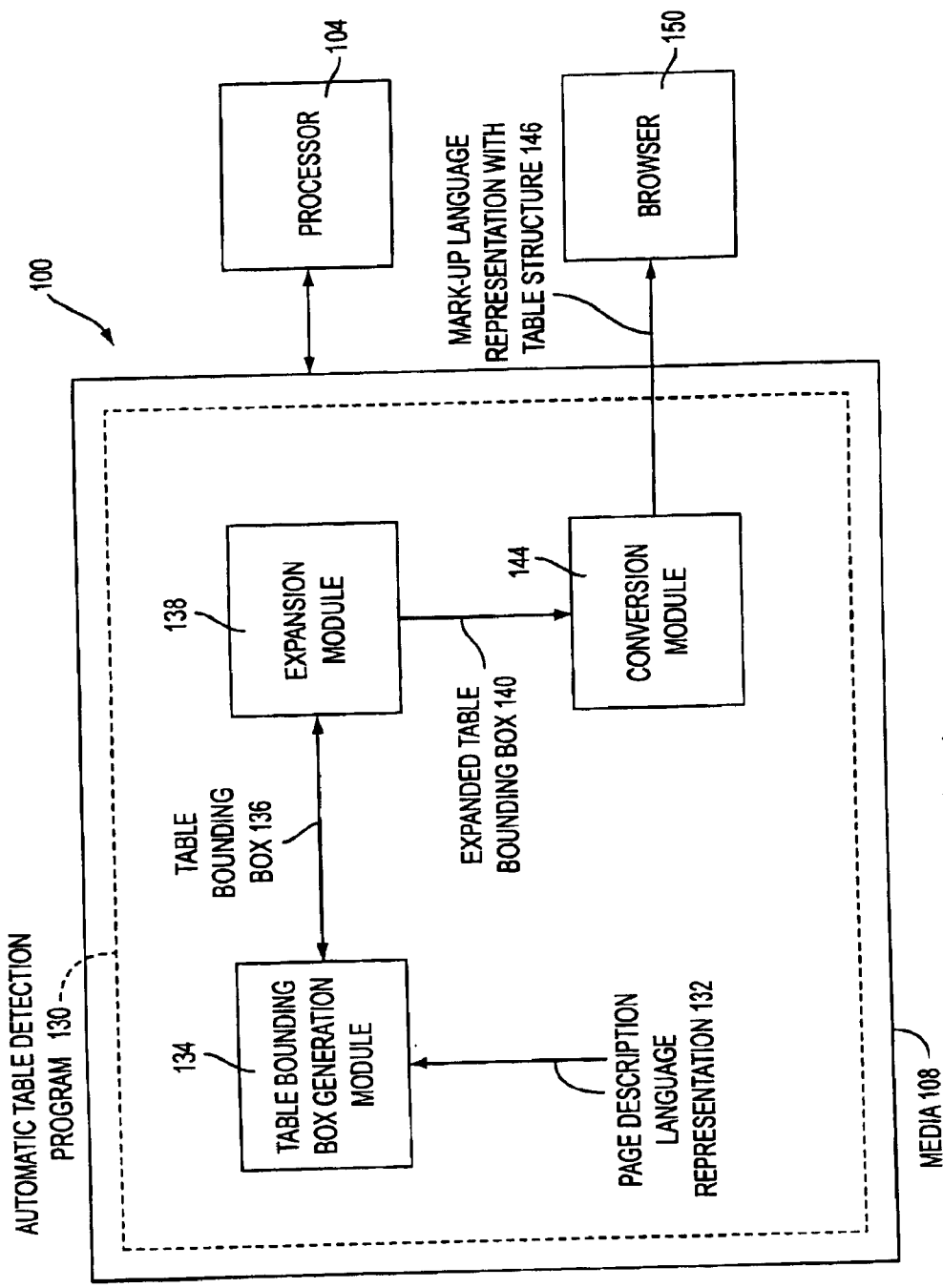
FIG. 1 is a block diagram of a system which may be programmed to implement the present invention.

FIG. 1 illustrates a computer system 100 in which the automatic table detection program 130 of the present invention can be implemented. The system 100 includes a processor 104 for executing program instructions and a media 108 that is accessible by the processor 104. The automatic table detection program can be embodied on media 108, which may be incorporated in office equipment (e.g., a personal computer) or separate from office equipment. When incorporated in office equipment, the media 108, having the automatic table detection program 130 embodied therein, can be in the form of a memory (e.g., random access memory (RAM), read only memory (ROM), etc.). When incorporated separate from the office equipment, the media, having the automatic table detection program 130 embodied therein, can be in the form of a computer-readable medium, such as a floppy disk, compact disc (CD), etc.

In the currently preferred embodiment, the present invention is related to the use of computer system 100 to implement the automatic table detection program 130. The automatic table detection program 130 automatically identifies table data in electronic documents that are described by a page description language (PDL), which has no provision for representing tables. One such page description language is the Portable Document Format (PDF) language.

The automatic table detection application includes a table bounding box generation module 134 for receiving a page description language representation 132 of a document without table structure, and based thereon, generates a table bounding box 136 for each table in the document. An expansion module 138 is coupled to the table bounding box generation module 134 for receiving the table bounding box 136, and based thereon, selectively expands certain edges of table bounding box to generate an expanded table bounding box 140. It is noted that in some cases, expanded table bounding box 140 is identical to the table bounding box 136. A conversion module 144 is coupled to the expansion module 138 for receiving the expanded table bounding box 140, and based thereon, converts the words encompassed by the table bounding box into a markup language representation 146 with table structure. For example, once the tables have been identified, the table data may be converted to a markup language, such as the Extensible Markup Language (XML) while preserving the table structure. The markup language representation 146 can then be viewed by utilizing a viewer 150 (e.g., a HTML browser program) or used for further processing. The process of automatically detecting the table data in the electronic document and of converting the table to a markup language shall now be described in greater detail.

Overview of Automatic Identification and Conversion

The automatic identification and conversion technique employed by the present invention shall be explained with reference to electronic documents that are described by a page description language and converted to a markup language. However, there are other electronic documents described using other descriptive languages that are equivalent to documents described by a page description language. The document may have one or more pages. The present invention utilizes the following as inputs: a list of words, the position of each word on a page with respect to a predetermined reference point on the page, and the size of each word.

These inputs can be specified by a page definition language description of the document or any other document description. Also, there are other languages, beside the markup language to which the present invention can convert the table data. Consequently, the techniques described herein apply to all documents with table data, whether or not such documents are actually described in a page description language representation. However, it is important that the representation of the document include position information for each word in the document. In addition, the techniques described herein apply to all forms of table data whether or not the table data are finally described in a markup language representation.

In general, the table detection technique of the present invention detects tables by (1) receiving a description of the document (e.g., list of words, and the size of each word, and the position of the word with respect to a particular page); 2) determining one or more table-identifying features based on the description of the document; (3) detecting the table data based on at least one of the table identifying features; and (4) converting or transforming the table data into a second format. While the description of the table is changed during the transformation, the new description of the table preserves the structure of the original table.

Figure 2:
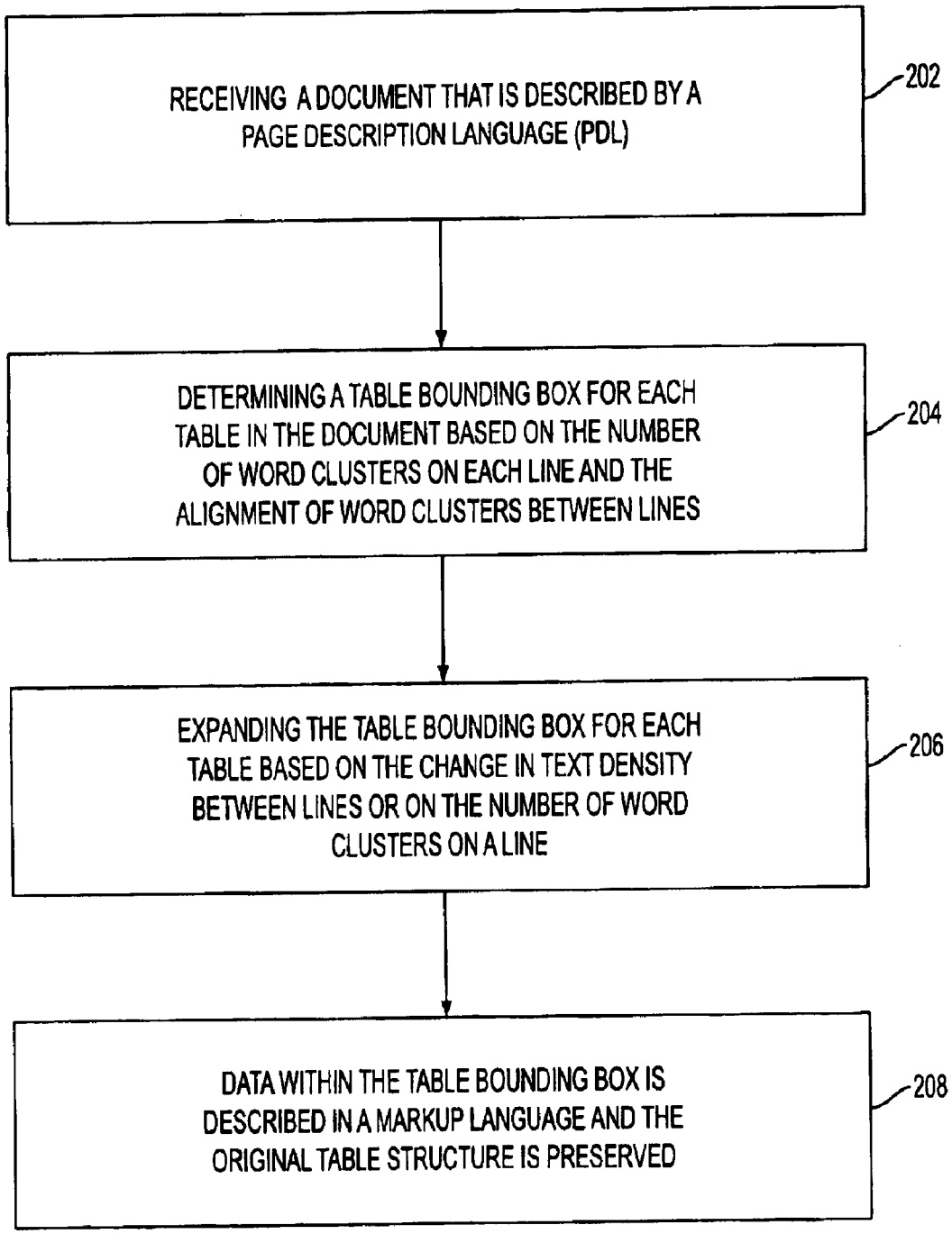
FIG. 2 is a flow chart illustrating steps for automatically identifying and converting table data.

Referring to FIG. 2, in step 202, a document that is described by a page description language (PDL) is received. The PDL representation specifies the position and format of each word on the page. From the PDL representation the following parameters can be obtained: (1) a list of the words in the document, (2) the location (e.g., coordinates in x-y space with reference to a page origin) of each word, and (3) the size of each word. The page origin can be the lower left corner of the page. The size of each word can be represented by a word bounding box that specifies the width and height of the word with reference to a word origin, which can be the lower left corner of the word bounding box.

In step 204, a table bounding box is determined for each table in the document. The table bounding box is determined based on the number of word clusters in each line and the alignment of word clusters between lines. The word clusters on each line can be determined by utilizing the position of the words. In step 206, the table bounding box for each table is expanded based on the change in text density between lines or the number of word clusters on a line. In step 208, the text that is encompassed by the table bounding box is described by a markup language, and the table structure is preserved. Alternatively, the step of expanding the table bounding box based on text density differences (step 206) can be omitted, and step 208 can be processed immediately after step 204. The advantage of including step 206 in the processing is that the start and end points of the tables can be more accurately detected.

Identification of Table Bounding Box

The present invention utilizes one or more table identifying features to automatically identify a table bounding box for each table. A table bounding box includes a table origin with respect to a predetermined reference point on the page and specifies the size (e.g., the width and height) of the table with respect to the table origin, which can be the lower left corner of the table bounding box. These table identifying features can include, but are not limited to, the alignment of word clusters between lines of text, the differences in text density between lines of text, drawing lines separating different elements in the table, and one or more heading rows at the top of the table. The alignment of word clusters and the text density between lines are described in greater detail hereinafter with reference to FIG. 3A and 3B.

According to the method, the present invention automatically identifies table data in the document by utilizing one or more table-identifying features. One table-identifying feature is the number of word clusters on a line. A second table-identifying feature is the alignment of word clusters between lines. A third table-identifying feature is the differences in text density (or space density) between lines. In addition, the automatic identification technique of the present invention may also use one or more heading rows at the top of the table as a fourth table-identifying feature. For example, for certain applications, the words in a table title can be utilized to detect the beginning of a table. Also, a fifth table-identifying feature can be the drawing lines that separate different data elements in the table. For example, the vertical drawing lines between columns of a table can be utilized to detect the beginning of new clusters of words on a line. Similarly, the horizontal drawing lines between rows of a table can be utilized to detect the rows of a table.

In the currently preferred embodiment, the present invention utilizes both alignment of word clusters between lines and horizontal spacing (e.g., text density between lines) to automatically identify the table bounding box for each table. It is noted that other table identifying features, such as table heading and table lines separating the elements in the table can be utilized in conjunction with word cluster alignment and text density to automatically identify the table bounding box.

Figure 3A:
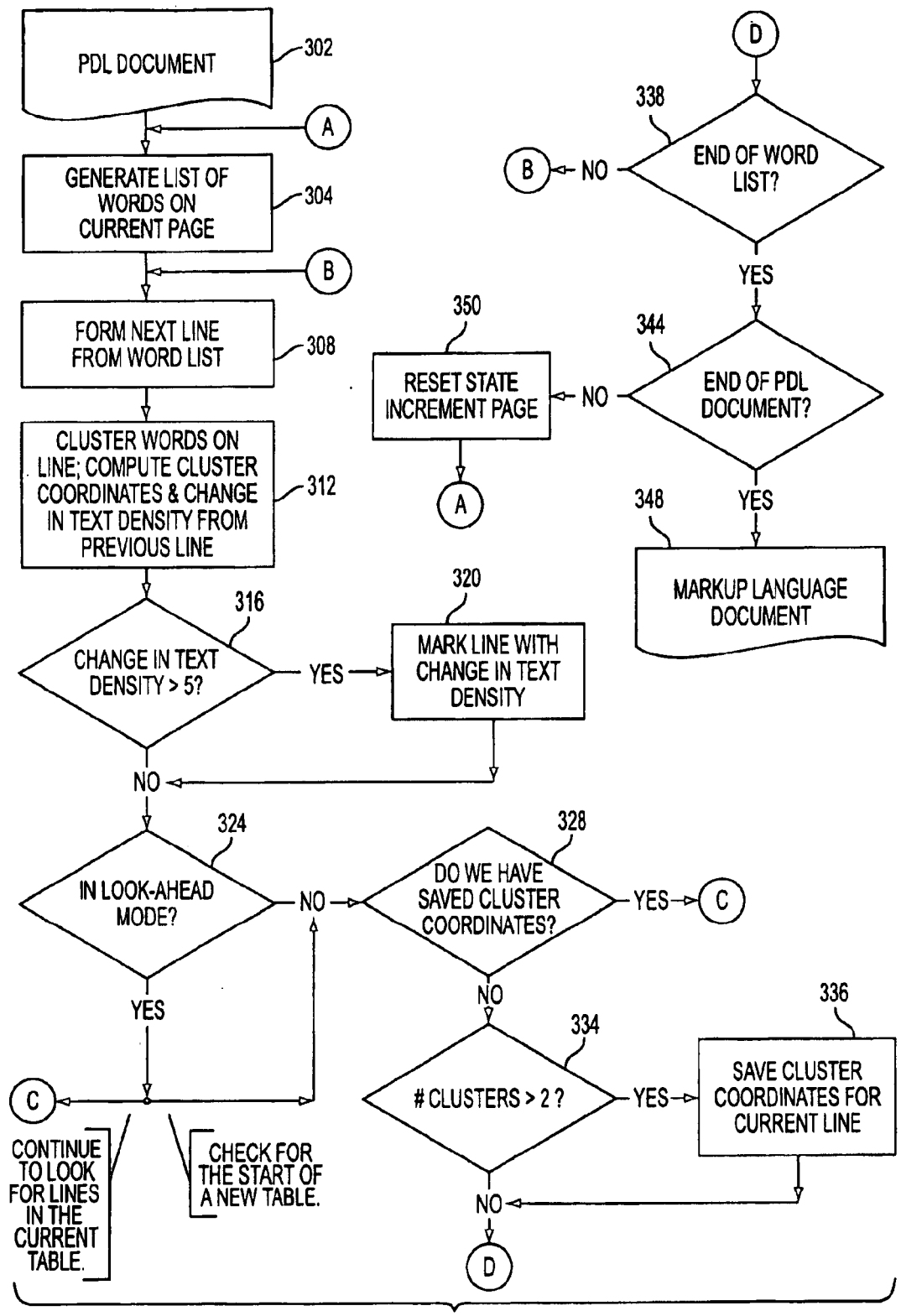
FIGS. 3A and 3B illustrate a flow chart that shows step 204 of FIG. 2 in greater detail.
Figure 3B:
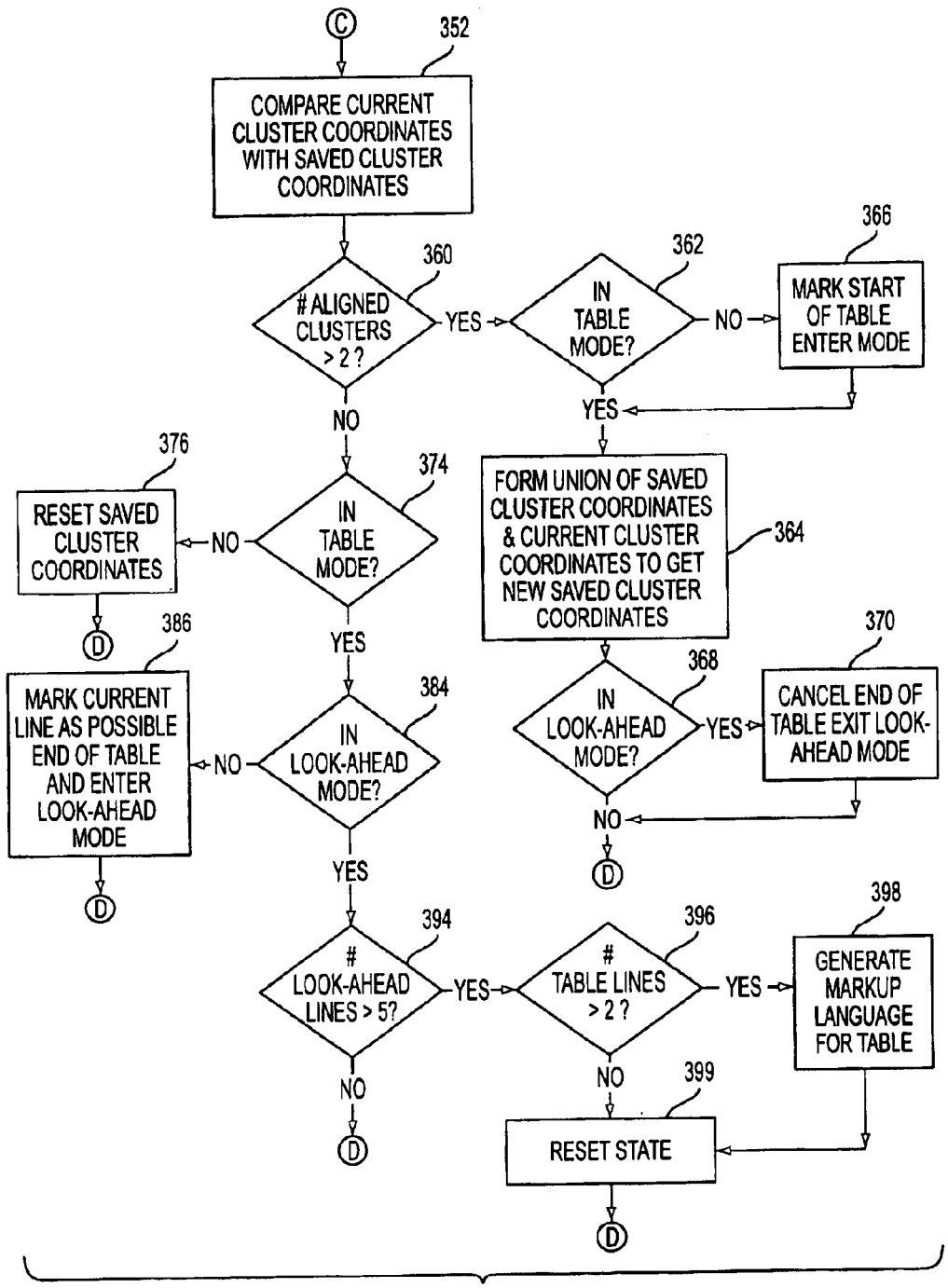

Referring to FIG. 3A and 3B, a document 302 described in a first description language (e.g. a PDL language) is received as an input. In step 304, a list of words (hereinafter referred to as "word list") for a particular page is generated based on the PDL document 302. For example, in the PDF language, a pre-defined function, PDWordFinderAcquireWordList( ), can be utilized to return a list of words associated with a particular page when the function is provided with the following input parameters: (1) a page number, and (2) the type of order. Preferably, a default order can be specified in which the returned list of words are provided in the order in which the words were inputted by the creator of the document. The list of words includes position and size information for all the words for the requested page.

The processing performed by the method of the present invention preferably operates line-by-line on all lines of text for a particular page. Accordingly, in step 308 the word list for a particular page is sorted into lines of text based on a first coordinate (e.g., the y-coordinate). For example, all words having the same y-coordinate would be sorted into the same line of text.

In step 312, the words on a line are clustered into one or more word clusters, and cluster coordinates are computed for each word cluster. Clustering the words of a line of text into one or more clusters involves examining the space between the words. If the space between words of the line increases by more than a predetermined amount, a new cluster is detected. For a line of text without any table information, the entire line of text is determined by the present invention to be a single cluster of words because the spacing between the words in regular text is generally uniform (i.e., there will be no sudden increases or jumps in the spacing between words). However, for a line of text with table information, the line of text is determined by the present invention to have multiple clusters of words, where the number of word clusters corresponds to the number of columns of table data in that line. The present invention utilizes the differences in text position to detect tabular data since the spacing between text in a table is generally greater than the spacing between words in regular text (i.e., non-tabular text).

Computing the cluster coordinates involves determining the beginning point of the cluster, the mid-point of the cluster, and the end point of the cluster, which are used to compare with clusters determined from another line as described in greater detail hereinafter.

In step 312, a text density for the current line is also calculated. The calculation of the text density for the current line is based on the average spacing between the words on that line.

In decision block 316, a determination is made whether the change in text density from the previous line to the current line is greater than a predetermined threshold (e.g., a change in text density of five times). If yes, in step 320, the change in text density is recorded by generating a text density tag. The text density tag can be a markup language tag that specifies the value of the change in text density. This tag is used during the table bounding box expansion. If no, in decision block 324, a determination is made whether the process is in a look-ahead mode. If no, in decision block 328, a determination is made whether the cluster coordinates have been saved. If yes, processing continues at step 352 where the current cluster coordinates are compared with saved cluster coordinates.

If the cluster coordinates have not been saved, a determination is made whether the number of clusters in the current line is greater than a predetermined cluster number (e.g., two) in decision block 334. If yes, in step 336, the cluster coordinates for the current line are saved. The cluster coordinates can be saved by utilizing a cluster tag that can be a markup language tag for specifying the start point (e.g., the column or x-coordinate where each cluster begins), mid-point (e.g., the column or x-coordinate of the middle of the cluster), and end-point (e.g., the column or x-coordinate where each cluster ends) of each cluster in the line. If the number of clusters is not greater than a predetermined cluster number, processing proceeds to decision block 338 where it is determined whether the end of word list has been reached. If the end of word list has not been reached, processing jumps back to step 308 in order to process the next line.

If the end of word list has been reached, a determination is made whether the end of the document has been reached in decision block 344. If yes, a markup language representation 348 of the document having table structure preserved therein is provided as an output. For example, in an HTML representation, the document includes a plurality of browser commands that control the placement, format, and display of text. If the end of the document has not been reached, the state is reset, and the page is incremented in step 350. The processing jumps back to step 304 in order to process the next page in the document.

Referring to decision block 324, if it is determined that the process is in a look-ahead mode, processing proceeds concurrently to both step 352 and step 328. At this point, the process of continuing to look for lines in the current table and the process of checking for a start of a new table are performed concurrently. For example, two separate processes can be utilized to perform these steps in parallel. Alternatively, if a single process is utilized, measure should be taken to differentiate between variables in the different steps.

In step 352, the current cluster coordinates are compared with the saved cluster coordinates. For example, the word clusters determined from the current line of text can be compared with the word clusters of the previous line. It is noted that the text in each column of a table can be left justified, right justified or centered with respect to the column width. Preferably, the present invention determines the beginning point, end point, and midpoint of each word cluster so that table data is automatically detected regardless of the particular format of the text in the table.

For example, the beginning point of the cluster of the current line can be compared with the beginning point of the cluster of the previous line to detect the alignment between the word clusters having left-justified text. Similarly, the mid-point of the cluster of the current line can be compared with the midpoint of the cluster of the previous line to detect the alignment between the word clusters having centered text. In a similar manner, the end point of the cluster of the current line can be compared with the end point of the cluster of the previous line to detect the alignment between the word clusters having right-justified text.

After step 352, in decision block 360, it is determined whether the number of aligned clusters is greater than a predetermined number of aligned clusters (e.g., two aligned clusters). If yes, in decision block 362, it is determined whether the process is in table mode. If yes, in step 364, new saved cluster coordinates are generated by forming the union of the saved cluster coordinates with the current cluster coordinates. The present invention utilizes a union operation in order to determine accurately a table bounding box for sparse tables (i.e., tables that have missing information or blanks in one or more columns. In the event the current line does not include data for a particular column in the table, by using the union operation, those columns that have missing information for one or more rows are nevertheless captured by the present invention. If no, in step 366, the current line is marked as "start-of-table", and table mode is entered. Processing then proceeds to step 364.

After processing step 364, in decision block 368, a determination is made whether look-ahead mode has been entered. If yes, in step 370, the end-of-table flag or status for the current line is canceled, and look-ahead mode is exited because the process is now continuing to find lines for the current table. Processing then continues to decision block 338.

If it is determined in decision block 360 that the number of aligned clusters is not greater than a predetermined number of aligned clusters, processing proceeds to decision block 374. In decision block 374, it is determined whether table mode has been entered. If no, in step 376, the saved cluster coordinates are reset, and processing proceeds to decision block 338. If yes, in decision block 384, it is determined whether look-ahead mode has been entered. If look-ahead mode has not been entered, the current line is marked as a possible "end-of-table", and look-ahead mode is entered in step 386. Thereafter, processing proceeds to decision block 338.

If look-ahead mode has been entered, then it is determined whether the number of look-ahead lines is greater than a predetermined number of look-ahead lines (e.g., five) in decision block 394. If the number of look-ahead lines is not greater than the predetermined number of look-ahead lines, processing proceeds directly from decision block 394 to decision block 338. If the number of look-ahead lines is greater than a predetermined number of look-ahead lines, it is determined whether the number of table lines is greater than a predetermined number of table lines (e.g., two) in decision block 396. If the number of table lines is greater than a predetermined number of table lines, the markup language for table data is generated in step 398. This step involves the generation of a table bounding box that sets the bounds of the table and the column start and end points. The table bounding box and the column boundaries can be represented by table tags. Table tags may be a markup language tag for specifying the edges that encompass the table (e.g., a reference point, and the length and width of the table with respect to the reference point) and the column boundaries therein.

Step 398 is described in greater detail hereinafter with reference to FIG. 5. If the number of table lines is not greater than a predetermined number of table lines, the state is reset in step 399, and processing proceeds to decision block 338.

Exemplary Document With a Table

FIG. 6 illustrates a sample document 610 and how the present invention can be applied to automatically detect a table 620 in the document 610. The boxes shown in FIG. 6 (e.g., box 640 or box 644) represent clusters of words on each line of the document. The document 610 has a table 620 with three rows and five columns. The present invention processes the document 610 one line at a time. The present invention utilizes step 312 to cluster words on a line, to compute cluster coordinates, and to compute the change of text density between lines. Those lines having a significant change in text density are marked to indicate that the line is a possible start of a table. The first line 630 is processed first. In step 312, the text density of the first line 630 is determined. Also, words in the first line 630 are clustered (step 312). In this case, since the first line 630 has regular text (i.e., non-tabular data), only one word cluster is detected. Since the number of clusters is less than the predetermined number (e.g., less than two), the cluster coordinates associated therewith are not stored (decision block 334).

Next, the second line 634 is processed. The text density of the second line 634 is determined, and a difference or change in the text density between the first line 630 and the second line 634 is determined. The change in text density is then compared with a threshold (decision block 316). In this example, the change in text density between the first line 630 and the second line 634 is less than the threshold. Accordingly, the second line 634 is not marked (decision block 316). Similar to the first line 630, it is determined that there is a single word cluster in the second line 634.

Next, the third line 638 is processed. Since the text density of the third line 638 is significantly different than the text density of the second line 634 (i.e., the change in text density between the lines is at or above the predetermined threshold), the third line 638 is marked with a text density tag that is utilized for table box expansion. In general, when considering the space between words, a table generally exhibits a greater number of spaces between words than a normal line of text. Similarly, the number of letters (density of the number of letters) in a table is generally less than the number of letters in a normal line of text.

As described above, as each line is processed, the present invention also determines the number of word clusters for each line. For example, for lines 630 and 634, it is determined that there is a single word cluster. However, for third line 638, it is determined that there are three clusters 640, 644, and 648. Since the number of word clusters exceeds a predetermined number of word clusters, the position information of each word cluster is stored. For the fourth line 650, it is determined that there are three clusters 652, 654, and 656. Since the number of word clusters exceeds a predetermined number of word clusters, the position information of each word cluster is stored.

It is noted that the first row of the table 620 has only three entries, and second row of the table 620 has only three entries making the table 620 a sparse table. The present invention utilizes a sparseness handling mechanism (processing step 364) to form the union of the saved cluster coordinates from a previous line and the cluster coordinates of the current line so that all columns of the table can be detected and captured.

For example, a union operation (processing step 364) is utilized so that the cluster information of the third line 638 is also included. As can be seen, the present invention captures the column position information of the third and fifth columns even though no data is provided in those columns in the third line 638. Similarly, the present invention captures the column position information of the first and fourth columns even though no data is provided in those columns in the fourth line 650.

The fifth line 660 includes five word clusters (662, 664, 666, 668, and 669). At this point, even though a union operation is utilized, all column positions have already been calculated in the processing for the previous line 650. The sixth line 670 exhibits a significant change in text density and is accordingly marked by the present invention. The sixth line 670 also only has a single word cluster. The present invention then enters look-ahead mode to determine if the true end of table has been reached. In this example, the seventh line 680 confirms that there is an end of table and look-ahead mode is exited.

According to one embodiment of the present invention, the top edge of the table bounding box 690 is then expanded in the positive y direction to encompass the previously marked line (i.e., the third line 638) that exhibited a significant change in text density. The bottom edge of the table bounding box 690 is then expanded in the negative y direction down to the previously marked line (i.e., the sixth line 670) that exhibited a significant change in text density. In this case, the top and bottom edges of the table bounding box 690 are already positioned correctly (i.e., the case where the first line of the table determined by the number of word clusters corresponds to the line marked by a significant change in text density) and so no expansion is needed.

However, in other cases, the first line of the table determined by the number of word clusters is different from the line marked by a significant change in text density. In these cases, the top edge of the table bounding box is expanded to encompass the line that was previously marked by present invention as having a significant change in text density, and the bottom edge of the table bounding box is expanded down to the line that was previously marked by present invention as having a significant change in text density. For example, if line 638 were to have only two clusters, which is below the threshold set forth in decision block 334, line 638 would not be marked as a start of table, but would instead be marked as having a significant change in text density. This significant change in density tag would be detected by the expansion module 138 of the present invention, which in turn, would extend the table boundaries to include line 638 in the table bounding box.

Expansion of the Table Bounding Box

Figure 4:
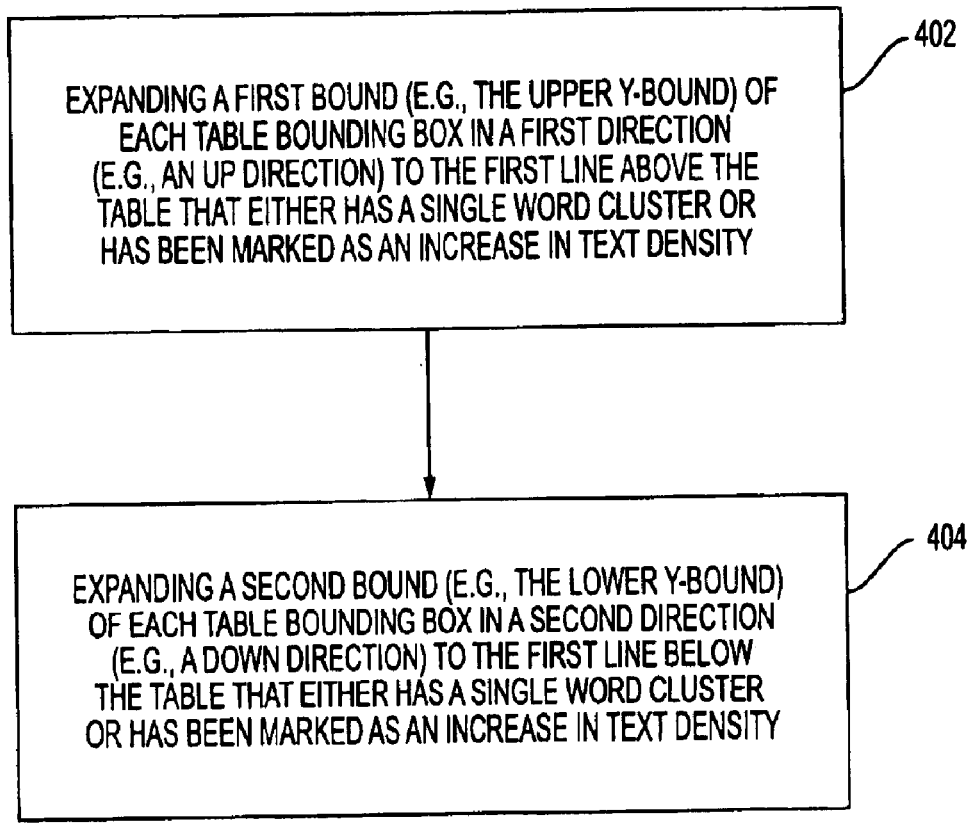
FIG. 4 is a flow chart showing the step 206 of FIG. 2 in greater detail.

FIG. 4 is a flow chart showing the step 206 of FIG. 2 in greater detail. In one embodiment, the step of expanding the table bounding box for each table can include the following steps. In step 402, a first bound (e.g., the upper y-bound) of each table bounding box is expanded in a first direction (e.g., the up direction) to the first line above the table that either has a single word cluster or has been previously marked as having a significant change in text density, whichever comes first. In step 404, a second bound (e.g., the lower y-bound) of each table bounding box is expanded in a second direction (e.g., the down direction) to the first line below the table that either has a single word cluster or has been previously marked as having a significant change in text density, whichever comes first.

FIG. 7 illustrates a document 700 that has a table where the present invention utilizes table bounding box expansion to expand the top and bottom of the table bounding box based on changes of text density. Based on the number of word clusters the bounding box 710 that has a top edge 712 and a bottom edge 716 is generated. During the processing of lines, line 720 and line 730 are marked as having a significant change in text density. During the table box expansion, the present invention expands the top and bottom edges to new top edge 714 that encompasses line 720 and a new bottom edge 718 that comes down to line 730.

Conversion of Table Data

Figure 5:
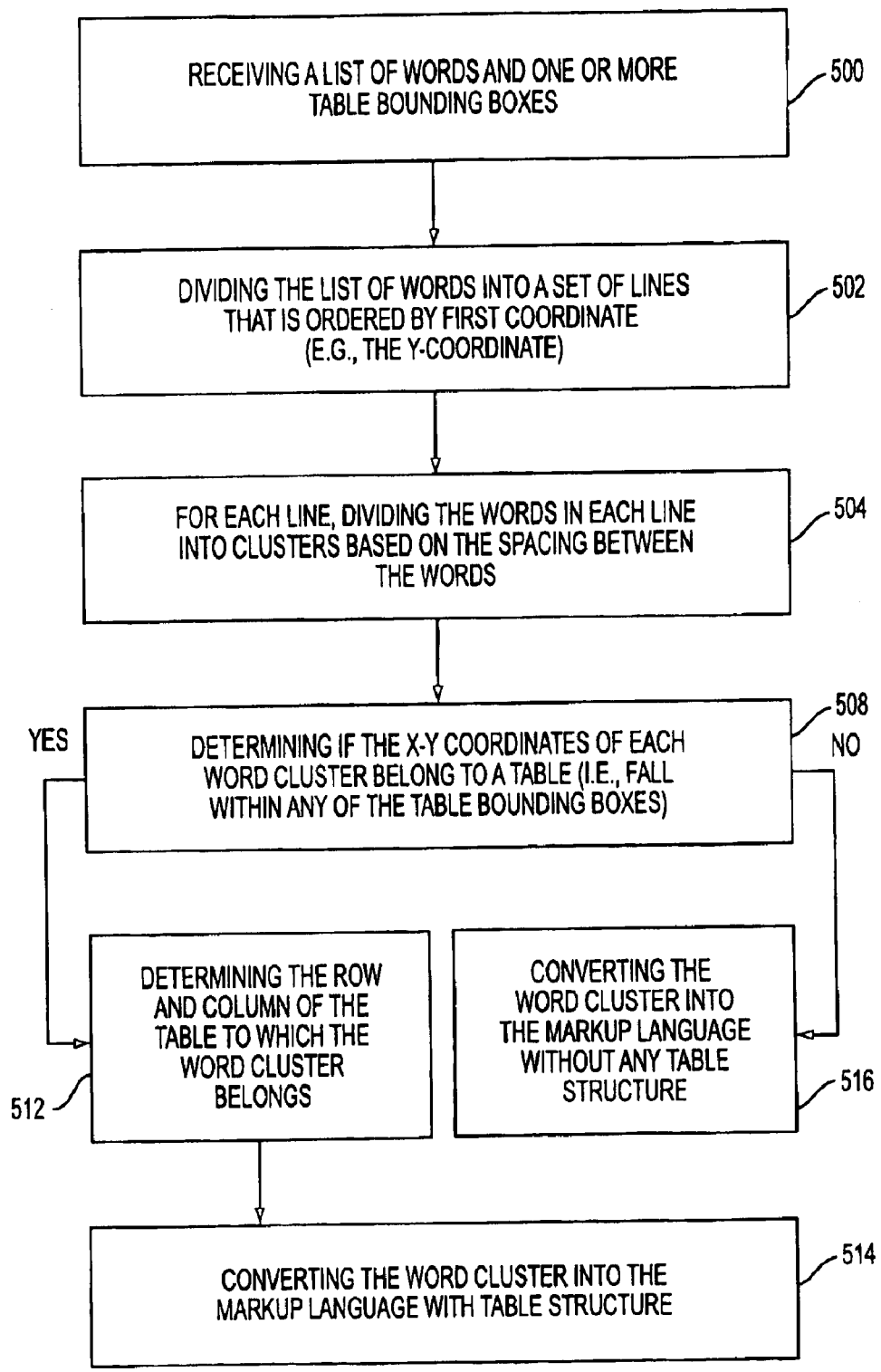
FIG. 5 is a flow chart showing the step 208 of FIG. 2 in greater detail.

FIG. 5 is a flow chart showing the step 208 of FIG. 2 in greater detail. In one embodiment, the step of converting the table data to a markup language can include the following steps. In step 502, the list of words is divided into a set of lines that is ordered by their y-coordinates. In step 504, for each line, the words of that line are divided into clusters based on the spacing between the words. The start point and end point (e.g., the x-coordinate of the start point and the x-coordinate of the end point) of each word cluster are determined. In step 508, the x-y coordinates of each word cluster are checked to determine if the word cluster belongs to a table (i.e., falls within any of the table bounding boxes). If yes, in step 512, the row and column of the table to which the word cluster belongs are determined. Steps 504 to 512 may be repeated until all the lines have been processed. In step 514, table data is converted into a mark-up representation with table structure. For example, markup commands that format the tables may be generated based on the locations in the tables of all word clusters that belong to tables. These markup commands are specific and defined by the particular markup language utilized. The commands for formatting data in table format are known as "table tags" and are generally well known by those of ordinary skill in the art. For example, in the HTML language, there are HTML table tags (i.e., specific HTML commands that instruct a browser to display data in a table format). These commands can include instructions for starting a table, starting a particular row, ending that row, starting a particular column, ending that column, and ending the table.

In step 516, non-table data is converted into a mark-up representation without any table structure. It is noted that other methods can be utilized to convert non-table text from a page definition language into a markup language. For the sake of brevity and since this description is directed to a method for automatically converting table data from a page definition language into a markup language, these methods for converting non-table text from a page definition language into a markup language, which are known by those of ordinary skill in the art, are not discussed herein.

As can be appreciated, once the table data has been automatically converted into a markup language representation by the present invention, data can be more easily extracted from the table as compared to table data in a page definition language representation without table tags.

With the proliferation of information readily accessible on the World Wide Web (WWW), manufacturers are desirous of publishing information regarding their products on their web pages so that its customers or potential customers can have immediate access to the information. For example, electronic component manufacturers desire to publish their data sheets corresponding to their electronic components. However, these data sheets typically have multiple tables that describe the mechanical characteristics, electrical characteristics, and operating conditions of the electrical component. These data sheets are generally created in a page definition language, such as the PDF language, which does not have table-identifying tags. Accordingly, one application of the present invention is to utilize the present invention to automatically convert the information in data sheets from the page definition language representation into a markup language representation, such as HTML, without human intervention and while preserving the table structure in the markup language representation.

Preserving the table structure is important because valuable information would otherwise be lost if the table were "flattened" or if the table structure were altered from its original form. The ability to automatically detect table data and convert the table data from a page definition language representation into a markup language representation without human intervention is important to enable efficient processing (e.g., batch processing) of large amounts of data sheets. Once in the markup language representation, the table data in the data sheets can be easily extracted and entered into a database.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A computer-implemented method of identifying table data in a document comprising the steps of:

a) receiving a page description language representation of the document for providing a list of words in the document and position information for the words; and b) automatically identifying table data in the document based on the page description language representation of the document and at least one table identifying feature, wherein the step of identifying includes the steps of, b1) automatically determining a table bounding box for each table in the document, wherein the table bounding box includes a top edge and a bottom edge;

b2) expanding each table bounding box based on a text density feature, wherein the expanding step includes the steps of, b2_1) for each line determining a text density measure;

b2_2) for each line determining a change of text density between the current line and the previous line;

b2_3) if the change in text density reaches a predetermined threshold, marking the current line with a text density tag;

b2_4) expanding the top edge of the table bounding box in a first direction to one of a line previously marked by a text density tag and a line with a single word cluster; and b2_5) expanding the bottom edge of the table bounding box in a second direction to one of a line previously marked by a text density tag and a line with a single word cluster; and b3) converting the table data encompassed by each table bounding box to a markup language representation.

2. The method of claim 1 wherein the step of automatically identifying table data in the document based on the page description language representation of the document and at least one table identifying feature further comprises:

b1) dividing the document into one or more pages;
b2) dividing each page into a plurality of lines;
b3) for each line, clustering the words of the line into one or more word clusters;
b4) automatically identifying table data in the document based on the number of word clusters for each line and the alignment of the word clusters between lines.

3. The method of claim 2 wherein the step of automatically identifying table data in the document based on the number of word clusters of each line and the alignment of the word clusters between lines further comprises:
 b4_1) using the word clusters to generate column position information; and
 b4_2) updating the column position information by performing a union operation between the column position information of the previous line and the column position information of the current line.

4. The method of claim 1 wherein receiving a page description language representation of the document for providing a list of words in the document and position information for the words includes receiving a PDF representation of the document, and wherein converting the table data encompassed by each table bounding box to a markup language representation includes converting the table data encompassed by each table bounding box to a HTML representation.

5. The method of claim 1 wherein the step or automatically identifying table data in the document based on the page description language representation of the document and at least one table identifying feature further comprises:
 b1) automatically identifying table data in the document based on one or more table headings.

6. The method of claim 1 wherein the step of automatically identifying table data in the document based on the page description language representation of the document and at least one table identifying feature further comprises:
 b1) automatically identifying table data in the document based on one or more horizontal lines and vertical lines that separate rows or columns of the table.

7. A computer-readable medium having stored thereon sequences of instructions, said sequences of instructions including instructions which, when executed by a processor, cause said processor to perform the steps of:
 a) receiving a page description language representation of a document for providing a list of words in the document and position information for the words; and
 b) automatically identifying table data in the document based on the page description language representation of the document and at least one table identifying feature, wherein the identifying step includes the steps of,
  b1) dividing the document into one or more pages;
  b2) dividing each page into a plurality of lines, wherein the dividing step includes the steps of,
   b2_1) for each line determining a text density measure;
   b2_2) for each line determining a change of text density between the current line and the previous line;
   h2_3) if the change in text density reaches a predetermined threshold, marking the current line with a text density tag;
   b2_4) expanding the top edge of the table bounding box in a first direction to one of a line previously marked by a text density tag and a line with a single word cluster; and
   b2_5) expanding the bottom edge of the table bounding box in a second direction to one of a line previously marked by a text density tag and a line with a single word cluster;
  b3) for each line, clustering the words of the line into one or more word clusters; and
  b4) automatically identifying table data in the document based on the number of word clusters for each line and the alignment of the word clusters between lines.

8. The computer-readable medium of claim 7 further containing instructions which, when executed by said processor, would cause said processor to perform the steps of:
 b4_1) using the word clusters to generate column position information; and
 b4_2) updating the column position information by performing a union operation between the column position information of the previous line and the column position information of the current line.

9. The computer-readable medium of claim 7 further containing instructions which, when executed by said processor, would cause said processor to perform the steps of:
 b1) automatically determining a table bounding box for each table in the document;
 b2) expanding each table bounding box based on a text density feature; and
 b3) converting the table data encompassed by each table bounding box to a markup language representation.

10. A document processing system comprising:
 a) a processor for executing programs; and
 b) a table identification program for receiving a page description language representation of a document, the page description language representation providing a list of words in the document and position information for the words, and for automatically identifying table data in the document based on the page description representation of the document and at least one table identifying feature, wherein the table identification program includes,
  b1) a bounding box generation module for receiving the list of words and for automatically generating a table bounding box for each table in the document based on the number of work clusters in each line; and
  b2) an expansion module coupled to the bounding box generation module for receiving the table bounding box for each table in the document, wherein each table bounding box has a first edge and a second edge; the expansion module for expanding the first edge in a first direction to one of a line that has a single word cluster and a line that has been previously marked with a text density tag and for expanding the second edge in a second direction to one of a line that has a single word cluster and a line that has been previously marked with a text density tag.

11. The document processing system of claim 10 wherein the table identification program further comprises:
 b3) a conversion module coupled to the bounding box generation module for receiving the table bounding box for each table in the document, and for converting the words encompassed by the table bounding box into a markup language representation that maintains the table structure of each table.

\* \* \* \* \*